United States Patent [19]

Imaide et al.

[11] Patent Number: 4,819,075

[45] Date of Patent: Apr. 4, 1989

[54] SOLID STATE IMAGING APPARATUS WITH MEANS FOR CONTROLLING SIGNAL ACCUMULATION PERIOD

[75] Inventors: Takuya Imaide; Ryuji Nishimura, both of Yokohama; Masaru Noda, Kanagawa, all of Japan

[73] Assignee: Hitachi, Ltd., Tokyo, Japan

[21] Appl. No.: 100,233

[22] Filed: Sep. 23, 1987

[30] Foreign Application Priority Data

Sep. 24, 1986 [JP] Japan ............................. 61-225329

[51] Int. Cl.⁴ ............................................. H04N 3/14
[52] U.S. Cl. .............................. 358/213.18; 358/211; 358/213.19
[58] Field of Search ............. 358/211, 213.18, 213.25, 358/213.19, 217, 219

[56] References Cited

U.S. PATENT DOCUMENTS

| | | | |
|---|---|---|---|
| 3,090,829 | 5/1963 | Lee et al. | 358/211 |
| 4,131,919 | 12/1978 | Lloyd et al. | 360/9 |
| 4,456,931 | 6/1984 | Toyoda et al. | 358/335 |
| 4,547,807 | 10/1985 | Mitani et al. | 358/213.19 |
| 4,567,524 | 1/1986 | Levine | 358/213.19 |
| 4,598,321 | 7/1986 | Clabo et al. | 358/213.25 |
| 4,631,593 | 12/1986 | Kinoshita et al. | 358/909 |
| 4,656,518 | 4/1987 | Kosonocky et al. | 358/213.25 |
| 4,710,816 | 12/1987 | Yabumoto | 358/213.15 |
| 4,719,486 | 1/1988 | Hoshino et al. | 358/408 |
| 4,719,511 | 1/1988 | Hirobe et al. | 358/213.19 |

Primary Examiner—Robert Lev
Attorney, Agent, or Firm—Antonelli, Terry & Wands

[57] ABSTRACT

In an apparatus reading out picture data from an imaging device to store the data once in a memory and reading out the data again from the memory so that the video signal may be processed for reproduction, the period during which the picture data is read out from the imaging device is regulated to be varied according to luminance of an object, and to be longer than a field period, whereby a good reproduced picture with reduced noise is obtained.

7 Claims, 8 Drawing Sheets

| LUMINANCE DATA | MOTION DATA | ACCUMULATION DATA | m |
|---|---|---|---|
| X X X X X X | 1 X | 1 1 1 1 1 1 0 | 1 |
| X X X X X X | X 1 | 1 1 1 1 1 1 0 | 1 |
| 1 X X X X X | X X | 1 1 1 1 1 1 0 | 1 |
| 0 1 X X X X | 0 0 | 1 1 1 1 1 0 1 | 2 |
| 0 0 1 X X X | 0 0 | 1 1 1 1 0 0 1 | 4 |
| 0 0 0 1 X X | 0 0 | 1 1 1 0 0 0 1 | 8 |
| 0 0 0 0 1 X | 0 0 | 1 1 0 0 0 0 1 | 16 |
| 0 0 0 0 0 1 | 0 0 | 1 0 0 0 0 0 1 | 32 |
| 0 0 0 0 0 0 | 0 0 | 0 0 0 0 0 0 1 | 64 |

SOLID STATE IMAGING APPARATUS WITH MEANS FOR CONTROLLING SIGNAL ACCUMULATION PERIOD

BACKGROUND OF THE INVENTION

The present invention relates to a solid state imaging apparatus and more particularly to a high sensitivity solid state imaging apparatus.

There have so far been proposed a number of inventions about high sensitive, i.e. low noise, imaging apparatus. For example, in Japanese Laid-open Patent Publication No. 61-105979 is disclosed an invention to reduce noise to be produced in a signal transfer process by subjecting signal charges obtained by photoelectric conversion to A/D conversion at the early stage of their being transferred. Also, in Japanese Laid-open Patent Publication No. 59-37778, an invention about noise reduction in imaging apparatus is disclosed.

However, no art has been known as yet about means for suppressing shot noise to be produced at the time of photoelectric conversion in imaging apparatus using a solid state imaging device.

An object of the present invention is the provision of solid state imaging apparatus in which the shot noise is reduced and sensitivity is improved.

The solid state imaging apparatus of the present invention is provided with frame memories, and thereby, the accumulation period of the charge in photoelectric conversion is adapted to be controlled. That is, when an image of a dark object is taken, the accumulation period is prolonged so that the quantity of the signal charge is increased and thereafter the signal charge on the imaging device is slowly read out.

The accumulation period of the signal on the imaging device in conventional apparatus was either the field period or the frame period of the output signal. So that, in all cases, the signal accumulation period was set constant.

In contrast with this, the present invention is provided with frame memories and the image information read out from the imaging device is once stored on the frame memory and thereafter the data is read out again from the frame memory. And the signal accumulation period on the imaging device is adapted to be set longer than one frame period. Namely, the signal charge is read out from the imaging device taking a time m (m: an integer larger than 1) times as long as the ordinary read time and the thus read out signal charge is written in the frame memory. And, the data is read out from the frame memory at the regular rate. Hence, the same image information is output m times over.

Generally, when n signal electrons are generated by photoelectric conversion, root mean square of the shot noise is said to be $\sqrt{n}$ and the S/N ratio is said to be limited by $\sqrt{n}$.

According to the present invention, when the accumulation period is prolonged m times, the number of signal electrons is increased m times. Therefore, the S/N ratio is improved by $\sqrt{m}$ times against the shot noise and by m times against other noises.

The present invention is further provided with means for detecting motion of an object, whereby the accumulation period is automatically returned to the normal condition when the object moves, so that deterioration in the quality of image due to the residual image is reduced.

DETAILED DESCRIPTION OF THE PREFERRED EMBODIMENTS

Figure 1:
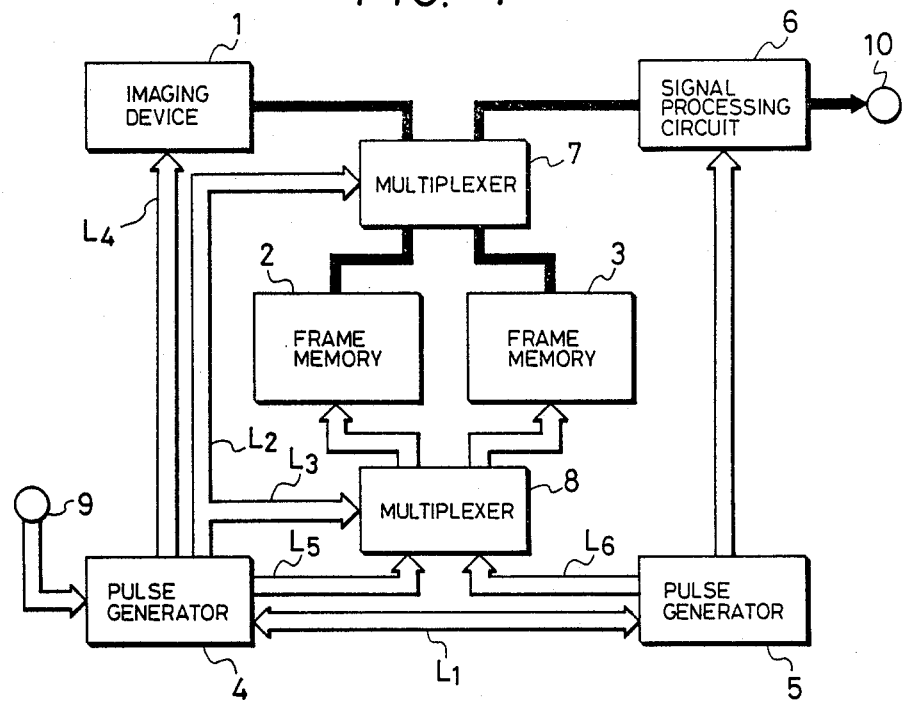
FIG. 1 shows a first embodiment of the present invention.
Figure 2:
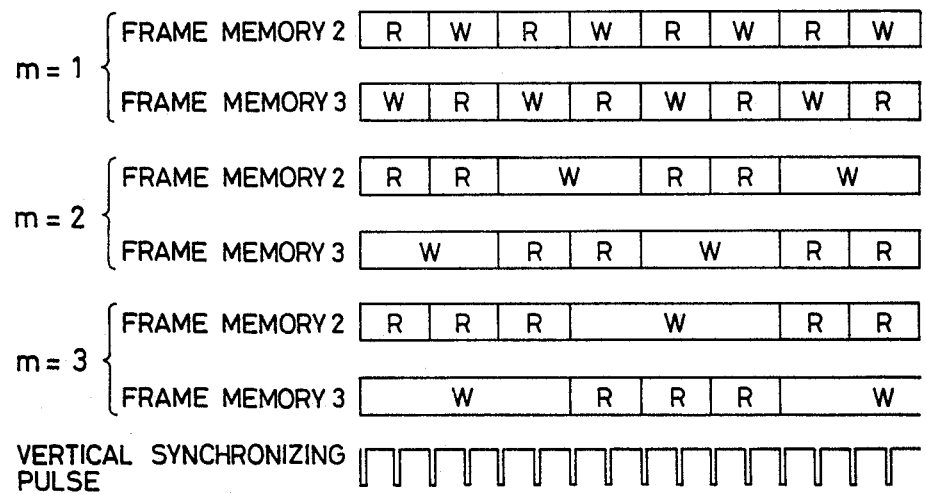
FIG. 2 is a timing chart showing the operation of the same.
Figure 3:
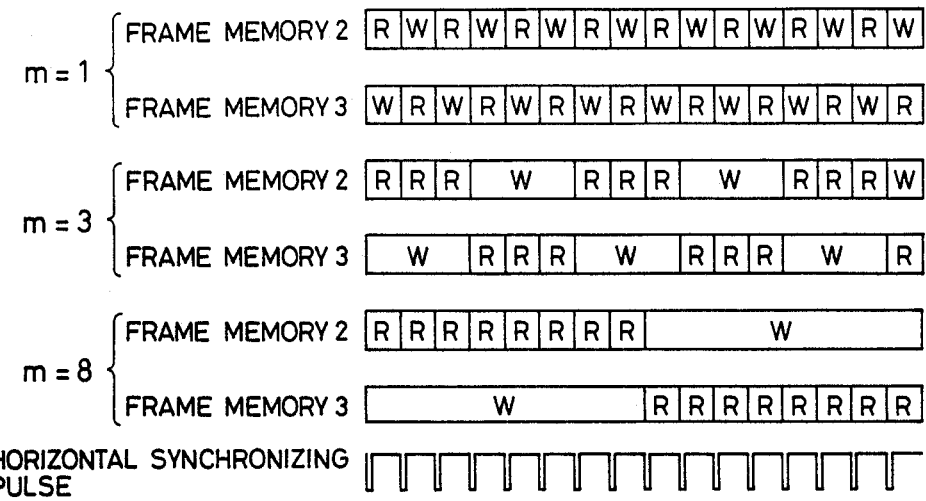
FIG. 3 is a timing chart showing the operation of an application example of the first embodiment.

A first embodiment of the present invention will be described below with reference to FIG. 1 to FIG. 3. FIG. 1 shows a block diagram of the first embodiment. Referring to FIG. 1, solid thick lines indicate signal data lines, while hollow thick lines indicate pulse lines for address, clock, etc. FIG. 2 and FIG. 3 are operational timing charts of frame memories. In FIGS. 2 and 3, "R" indicates the read period and "W" indicates the write period.

Referring to FIG. 1, the imaging device 1 is a known digital output imaging device. The frame memory 2 is a semiconductor DRAM (Dynamic Random Access Memory), for example, which has a capacity of sorting data of the entire picture elements of the imaging device 1. The frame memory 3 is similar to the frame memory 2.

The signal processing circuit 6 is for making calculation for obtaining the luminance signal and color difference signal, $\gamma$ processing, and blanking processing. The signal processing circuit (output circuit) 6 is constituted, for example, of a ROM (Read only Memory). From the output terminal 10 are output digital luminance signals and color difference signals. The signals output from the output terminal 10 are supplied to a digital VTR, digital TV, or after being subjected to a D/A conversion, to an analog VTR or analog TV.

The first pulse generator 4 is a circuit for generating a drive pulse for driving the imaging device 1 and a write address signal input to the frame memories 2, 3. Also, the first pulse generator 4, responding to data received from the accumulation period controlling terminal 9, outputs the drive signal for driving the imaging device 1 and the write address signal for the frame memories that are expanded m times along the time axis.

The second pulse generator 5 generates a read address signal input to the frame memories 2, 3. Also, the second pulse generator 5 generates such signals as a synchronization signal and a blanking pulse and supplies the same to the signal processing circuit 6. The second pulse generator 5 and signal processing circuit 6 are connected through the line $L_1$ and operate in synchronism with each other.

For a certain period of time, the first multiplexer 7 connects the output terminal of the imaging device 1 to the data input and output terminal of the frame memory 2, while the data input and output terminal of the frame memory 3 is connected with the input terminal of the signal processing circuit 6. During this period, the second multiplexer 8 supplies the write address signal generated by the first pulse generator 4 to the address input terminal of the frame memory 2 and the read address signal generated by the second pulse generator 5 to the address input terminal of the frame memory 3.

For another certain period of time, the first multiplexer 7 connects the output terminal of the imaging device 1 to the data input and output terminal of the frame memory 3, while the data input and output terminal of the frame memory 2 is connected with the input terminal of the signal processing circuit 6. During this period, the second multiplexer 8 supplies the write address signal generated by the first pulse generator 4 to the address input terminal of the frame memory 3 and the read address signal generated by the second pulse generator 5 to the address input terminal of the frame memory 2.

Now, the operation of the present embodiment will be described with reference to the timing chart of FIG. 2.

In FIG. 1, the first pulse generator 4, upon receipt of a control signal from the terminal 9 for prolonging the accumulation period m times, delivers a signal whose period is m times the period of the vertical synchronization signal to the fist multiplexer 7 and second multiplexer 8 through the line $L_2$ and line $L_3$. Then, the first multiplexer 7, during a time m times the period of the vertical synchronization signal, connects the output terminal of the imaging device 1 to the first frame memory 2 and also connects the output terminal of the second frame memory 3 to the signal processing circuit 6. Thereafter, during another time m times the period of the vertical synchronization signal, the first multiplexer 7 connects the output terminal of the imaging device 1 to the second frame memory 3 and also connects the output terminal of the first frame memory 2 to the signal processing circuit 6. Such operations are alternated.

Also, a clock expanded to m times the regular signal charge read clock is supplied from the first pulse generator 4 through the line $L_4$ to the imaging device 1 as the drive pulse. The signal charges on the imaging device 1 are successively read out according to this clock. Thus, the charges accumulated on the picture elements of the imaging device 1 are read out at the synchronization period m times the period of the vertical synchronization signal, and therefore, the accumulation period on the imaging device 1 becomes m times as large as the regular accumulation period. In the meantime, the write address signal generated by the first pulse generator 4 in synchronism with the mentioned clock is supplied to the second multiplexer 8 through the line $L_5$. And, this write address signal is supplied to the frame memory 2 or frame memory 3 selected by the second multiplexer 8.

On the other hand, the read address signal updated at the regular read period is supplied from the second pulse generator 5 through the line $L_6$ and the second multiplexer 8 to the frame memory 2 or frame memory 3. Therefore, the signal for one frame is read out from the frame memory 2 or frame memory 3 during the time of two vertical synchronization periods. The data read out from the frame memory 2 or frame memory 3 are supplied through the first multiplexer 7 to the signal processing circuit 6. Thus, the luminance signal and color difference signal are processed in the signal processing circuit 6 and these signals are output to the output terminal 10.

In the case where the accumulation period controlling information input from the terminal 9 is for m=1, the signal writing and reading are executed alternately on the frame memory 2 and frame memory 3 at intervals of one frame period as shown in FIG. 2.

Then, if the accumulation period controlling information input from the terminal 9 is for m=2, the signal writing in the frame memory 2 and frame memory 3 is executed at intervals of two frame periods. And, the signal reading from the frame memory 2 and frame memory 3 is executed at intervals of one frame period. Consequently, thesignal for one frame period is read out two times over from each of the frame memory 2 and frame memory 3.

Further, if the accumulation period controlling information input from the terminal 9 is for m=3, the signal writing in the frame memory 2 and frame memory 3 is executed at intervals of three frame periods. And, the signal reading from the frame memory 2 and frame memory 3 is executed at intervals of one frame period. Consequently, the same data is read out for three frames from the frame memory 2 and frame memory 3.

As described above, when m is larger than 1, the accumulation period on the imaging device is increased by m times whereby the N/S ratio is reduced to $1/\sqrt{m}$ time.

FIG. 3 shows a timing chart in the case where the signals are read from the imaging device 1 and the frame memories 2, 3 in such a manner that two lines are read simultaneously. In this case, the entire picture element data is output from the imaging device 1 through one time of vertical scanning. Therefore, in the case where the accumulation period controlling information input from the terminal 9 is for m=1, the signal writing and reading on the frame memory 2 and frame memory 3 are executed at intervals of one field period.

And, in the case where m=3, the signal writing in the frame memories 2, 3 is executed at intervals of three field periods, whereas the signal reading from the frame memories 2, 3 is executed at intervals of one field period.

Likewise, in the case where m=8, the signal writing in the frame memories 2, 3 is executed at intervals of eight field periods, whereas the signal reading from the frame memories 2, 3 is executed at intervals of one field period.

In these cases, too, the accumulation period on the imaging device 1 is increased by m times and the N/S ratio is reduced to $1/\sqrt{m}$ time.

Figure 6:
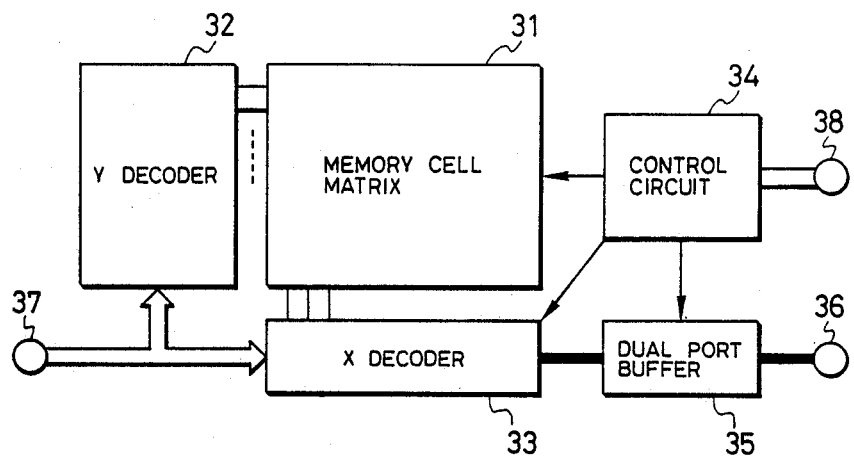
FIG. 6 shows a particular example of a frame memory shown in FIG. 1.

An example of construction of the frame memory 2, 3 used in the embodiment of FIG. 1 is shown in FIG. 6.

Referring to FIG. 6, 31 denotes a memory cell matrix, 32 denotes a Y decoder, 33 denotes an X decoder, 34 denotes a control circuit, 35 denotes a dual port buffer, 36 denotes a data input and output terminal, 37 denotes an address input terminal, and 38 denotes a control terminal.

When some data is written in the frame memory 2 or 3, namely, when the data is written in the memory cell matrix 31, the input side of the dual port buffer is turned on by the control circuit 34 whereby the memory cell matrix 31 is rendered write enable. Then, when a pulse for addressing is input from the address input terminal 37, the pulse is supplied to the Y decoder 32 and X decoder. Thereupon, the address in the memory cell matrix 31 is accessed by the Y decoder 32 and X decoder. Thus, the data input from the data input terminal 36 is stored through the dual port buffer 35 at the address specified by the Y decoder 32 and X decoder 33.

On the other hand, when the data is read out, the output side of the dual port buffer is turned on by the control circuit 34 whereby the memory cell matrix 31 is rendered read enable. Thus, the data is read out from the memory cell matrix 31 at the address accessed by the Y decoder 32 and X decoder 33.

Figure 10:
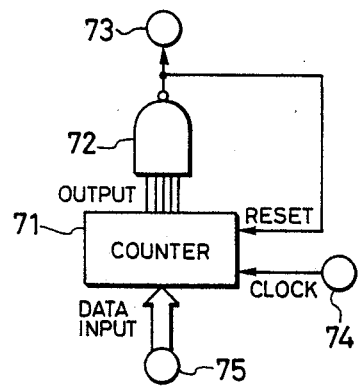
FIG. 10 shows a particular example of an accumulation period regulating circuit provided in a first pulse generator used in the first to fourth embodiments of the present invention.

A particular example of the first pulse generator 4 used in the embodiment of FIG. 1 is shown in FIG. 10. Referring to FIG. 10, 71 denotes a counter, 72 denotes a NAND gate, 73 denotes a first clock output terminal for the clock expanded m times along the time axis, 74 denotes a reference clock input terminal, and 75 denotes an initial data input terminal.

When some initial data is input from the terminal 75, the counter 71 is preset to this value. And, when m reference clocks are input from the terminal 74, a pulse is output from the NAND gate 72. This pulse is formed of the reference clock expanded by m times, which is output from the terminal 73 and also input to the counter 71. Upon receipt of this pulse, the counter 71 is reset to return to the initial value. By means of such a particular example as shown in FIG. 10, the value of m can be freely changed according to the initial data.

As the circuit for expanding the reference clock by m times, a well known programmable frequency divider may also be used.

Figure 4:
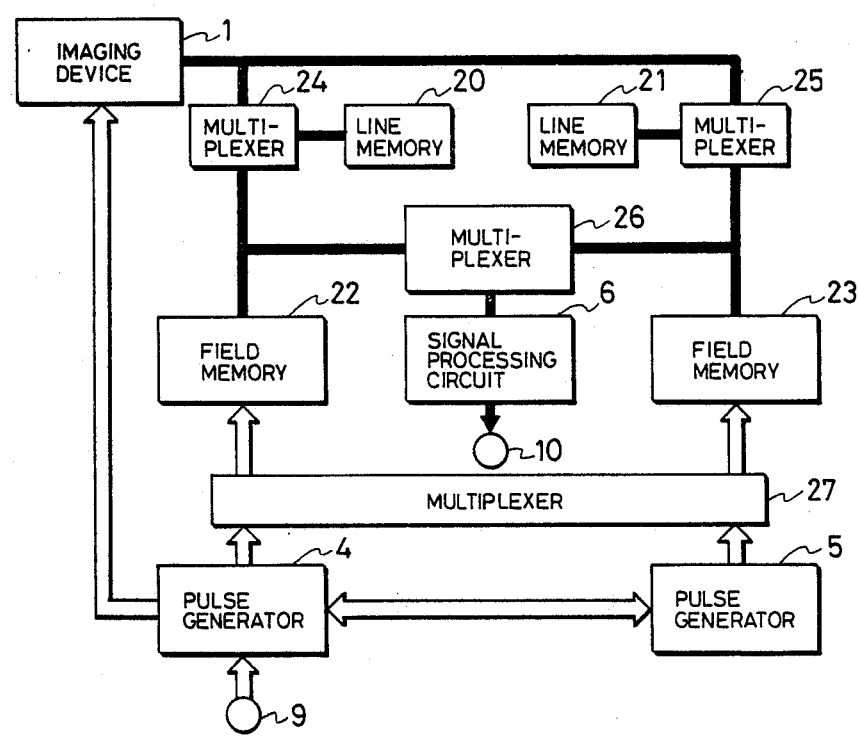
FIG. 4 shows a second embodiment of the present invention.
Figure 5:
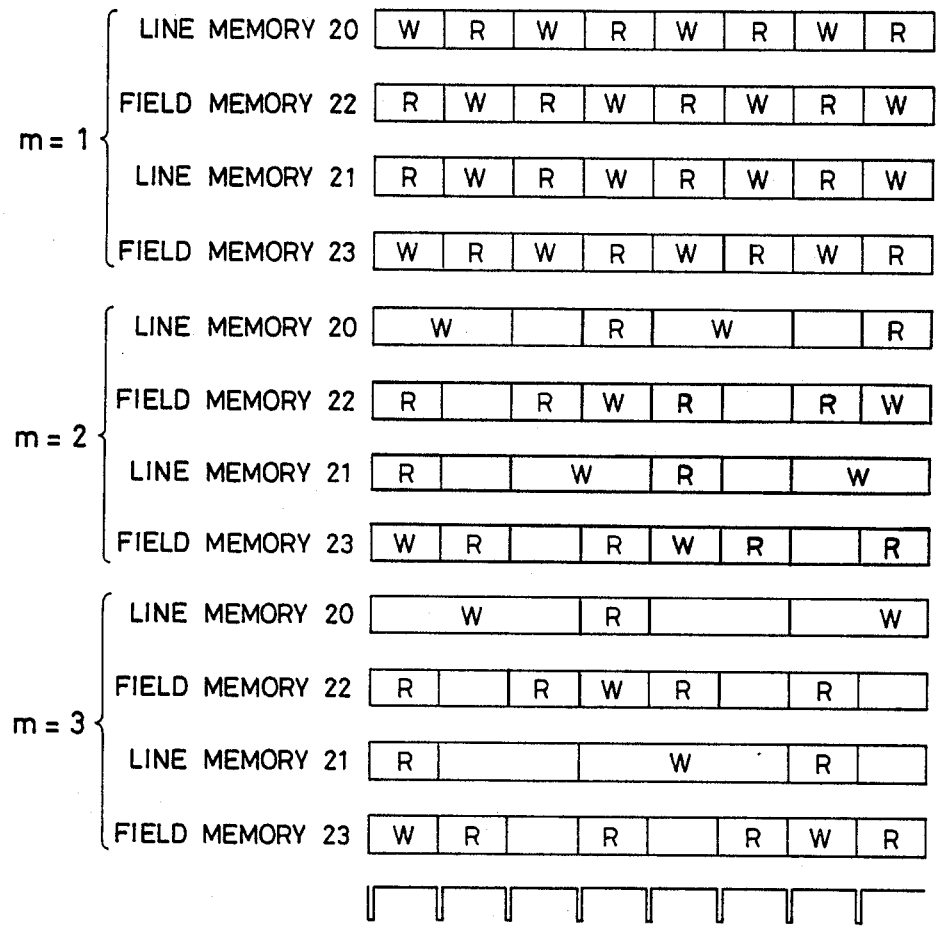
FIG. 5 is a timing chart showing the operation of the same.

A second embodiment of the present invention is shown in FIG. 4. And, the timing chart describing the operation of the same is shown in FIG. 5.

Referring to FIG. 4, 20 and 21 denote a first line memory and a second line memory, respectively, 22 and 23 denote a first field memory and a second field memory, respectively, and 24 to 27 denote first to fourth multiplexers, respectively. Corresponding reference numerals to those in FIG. 1 denote corresponding parts to those in FIG. 1. In the diagram, the control signal lines from the first pulse generator 4 to the multiplexers 24–27 and the signal line from the second pulse generator 5 to the signal processing circuit 6 are omitted.

The present embodiment is characterized in that the storage capacity of the memory is reduced by half. That is, the first field memory 22 and second field memory 23 put together have the storage capacity corresponding to the entire picture elements of the imaging device 1.

The signal storing in the first field memory 22 and the second field memory 23 is executed by a line sequential system and the signal is stored in the first and second field memories 22 and 23 alternately at intervals of one horizontal scanning period. Therefore, there are additionally provided the first and second line memories 20, 21 as buffer memories for one horizontal scanning period, and thereby, the increasing of the accumulation period m times is achieved.

The operation of the embodiment shown in Fig. 4 in the case where m=1 is as under. First, data on the first line is read out from the imaging device 1 and the data is written through the first multiplexer 24 in the first line memory 20. Then, the data stored in the first line memory 20 is read out and written through the first multiplexer 24 in the field memory 22. Simultaneously, data on the second line is read out from the imaging device 1 and the data is written through the second multiplexer 25 in the second line memory 21. Then, the data stored in the field memory 22 is read out and input through the third multiplexer 26 to the signal processing circuit 6. Simultaneously, the data stored in the second line memory 21 is read out and written through the second multiplexer 25 in the second field memory 23, and, at the same time, data on the third line is read out from the imaging device 1 and the data is written through the first multiplexer 24 in the first line memory 20. Then, the data stored in the second field memory 23 is read out and input through the third multiplexer 26 to the signal processing circuit 6. Simultaneously, the data stored in the first line memory 20 is read out and written through the first multiplexer 24 in the first field memory 22. At the same time, data on the fourth line is read out from the imaging device 1 and the data is written through the second multiplexer 25 in the second line memory 21. Thereafter, similar operations are repeated and the picture element data are sequentially input to the signal processing circuit 6.

The operations in the case where m≧2 are as under. With reference to FIG. 5, one line of data is read out from the imaging device 1 during a horizontal scanning periods and the data is written in the first or second line memory 20, 21. Therefore, data read out from the imaging device 1 are written in the two line memories 20, 21 alternately at intervals of m horizontal scanning periods. Then, the data stored in the first or second line memory 20, 21 is read out during one horizontal scanning period and written in the first or second field memory 22, 23. That is, while the data read out from the imaging device 1 (during m horizontal scanning periods) is written in one of the line memories (e.g., the first line memory 20), the data stored in the other line memory (e.g., the second line memory 21) is read out during one horizontal scanning period and written in the field memory. The other line memory (the second line memory 21) is out of operation during the remaining (m−1) horizontal scanning periods.

On the other hand, reading data from the first and second field memories 22, 23 is executed alternately at intervals of one horizontal scanning period.

According to the present embodiment as described above, the accumulation period on the imaging device 1 can be prolonged by m times with the storage capacity approximately half the storage capacity required for the embodiment of Fig.1.

Further, in the present embodiment, even if the signal storage in the field memories 22, 23 is executed by a dot sequential system or by a system in between the dot sequential system and the line sequential system, similar effect to that of the embodiment of FIG. 1 is obtained with a storage capacity reduced by half.

Figure 7:
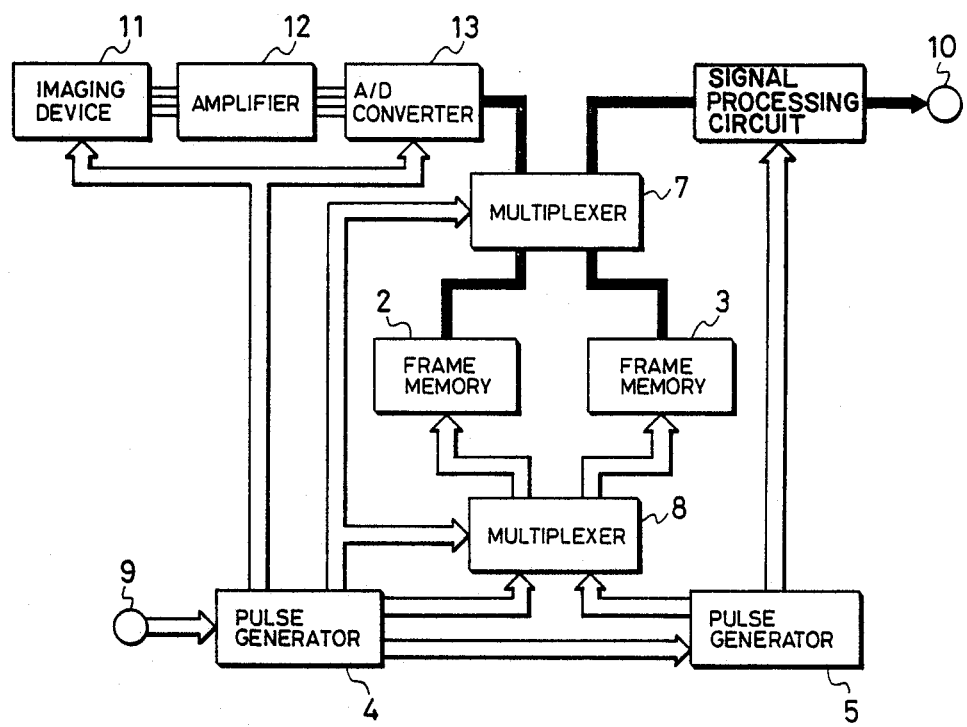
FIG. 7 shows a third embodiment of the present invention.

FIG. 7 shows a third embodiment of the present invention. In this embodiment of FIG. 7, there is provided an imaging device 11 for analog output and the output signal from the imaging device 11 is adapted to be amplified and then subjected to an A/D conversion in the A/D converter 13 before being processed. Other sections are similar to those in the embodiment of FIG. 1 and its operation is also similar to that of the embodiment of FIG. 1.

As the imaging device 11, a MOS imaging device can be used such as that described, for example, in a paper entitled "Investigation of Coloring System for Horizontal Transfer MOS Camera" by Imaide et al., Transactions of Society of Television Engineering, ED938 (Feb. 1986), or in a paper of the same contents entitled "A Solid State Color Video Camera with a Horizontal Readout MOS Imager" by Imaide et al., pp. 329–336, EEE Transactions on Consumer Electronics, Vol. CE-32, No. 3, Aug. 1986. When such a MOS imaging device is used, most of the noise is so-called blue noise having a spectrum proportional to the frequency.

Therefore, when the signal accumulation period becomes m times and the readout rate from the imaging device 11 becomes 1/m time, the signal quantity becomes m times and the noise quantity becomes $1/\sqrt{m}$ time, so that the S/N ratio is improved by $m^{3/2}$ times. If, for example, the accumulation period is increased from the conventional 1/60 sec. to 1/6 sec., the S/N ratio is improved by approximately 30 times.

Figure 8:
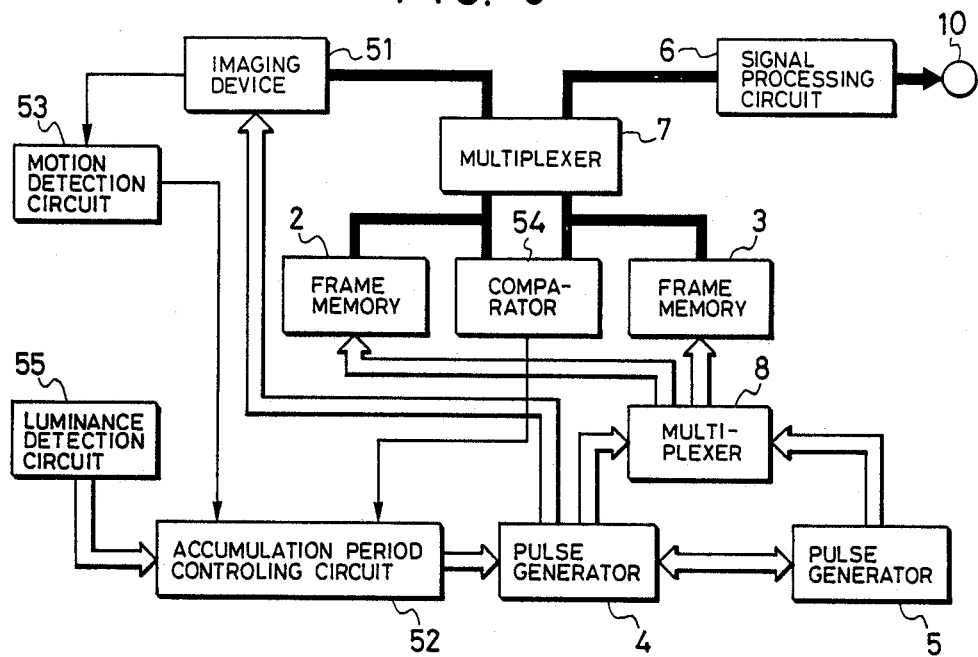
FIG. 8 shows a fourth embodiment of the present invention.
Figure 9:
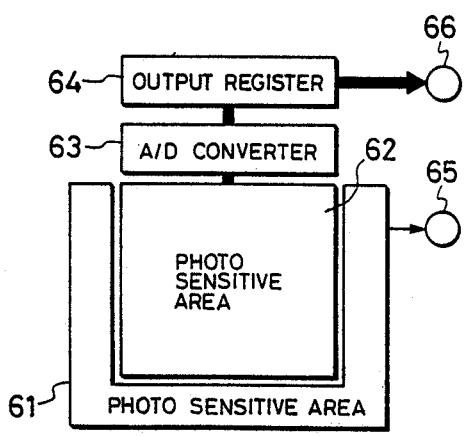
FIG. 9 shows a particular example of an imaging device shown in FIG. 8.

FIG. 8 and FIG. 9 show a fourth embodiment of the present invention. This embodiment is adapted such that the accumulation period is automatically controlled according to motion or luminance of an object.

Referring to FIG. 8, 51 denotes an imaging device, 52 denotes an accumulation period controlling circuit, 53 denotes a motion detection circuit, 54 denotes a comparator, and 55 denotes a luminance detection circuit. Writing and reading of signals on each frame memory are executed virtually the same as in the embodiment shown in FIG. 1.

An example of the imaging device 51 is shown in FIG. 9. The imaging device 51 shown in FIG. 9 is provided with a photosensitive area 62 surrounded by another photosensitive area 61, the output signal of the photosensitive area 61 being ouput from the terminal 65. The photosensitive area 61 may be simply formed of a single large photodiode or an array of plural photodiodes. The signal output from the terminal 65 is input to the motion detection circuit 53 wherein the motion of the object is detected. The signal output from the terminal 66 is input to a multiplexer 7.

The motion detection circuit 53 is formed, for example, of an amplifier and a bandpass filter and detects changes in the quantity of incident light on the photosensitive area 61. When the imaging device as shown in FIG. 9 is used, motion of an object only at the end portions of the picture plane is detected, but the embodiment shown in FIG. 8 has an advantage that it is responsive to the motion of a high speed. The detection of motion of the object in the center of the picture plane is performed by the comparator 54. The comparator 54 detects the motion of the object through comparison of contents of the first frame memory 2 and the second frame memory 3. The detection of motion of the object is performed, for example, during the blanking period of the imaging device 51.

The detection of motion by the comparator 54 has a disadvantage that the response is delayed according to the length of the accumulation period but has an advantage that changes in entire picture elements on the picture plane can be detected.

The luminance detection circuit 55 is a well-known circuit used in conventional still cameras and video cameras. The output signal of the motion detection circuit 53, output signal of the luminance detection circuit 55, and the output signal of the comparator 54 are input to the accumulation period controlling circuit 52. In this accumulation period controlling circuit is controlled the accumulation period of the imaging device 51. The accumulation period is set long when the luminance is low and set short when there is a motion.

Figures 11, 12:
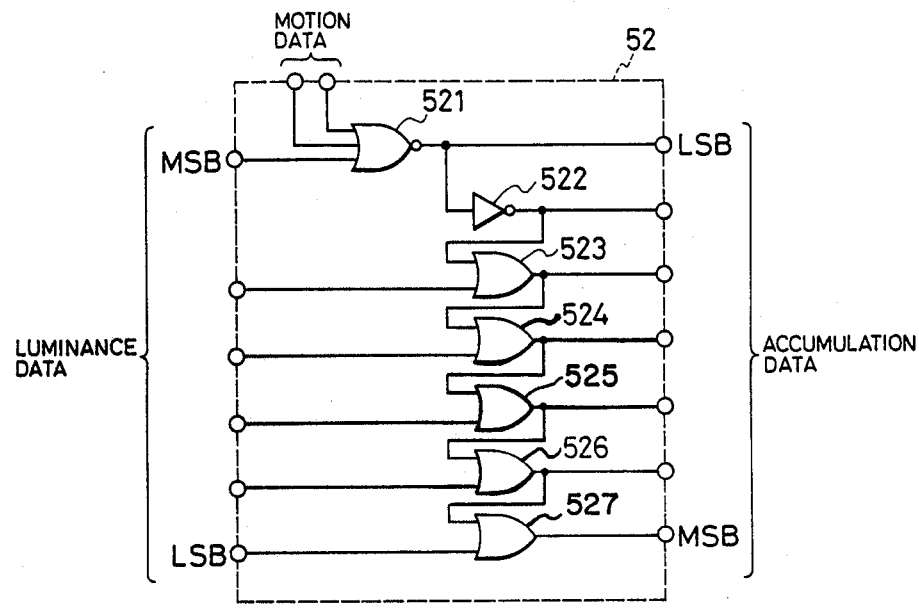
FIG. 11 shows a particular example of an accumulation period controlling circuit shown in FIG. 8.
FIG. 12 shows a truth table for the circuit shown in FIG. 11.

A particular example of the accumulation period controlling circuit 52 is shown in FIG. 11. The accumulation period controlling circuit 52 is supplied with luminance data from the luminance detection circuit 55 and motion data from the motion detection circuit 53 and the comparator 54. The motion data, for example, is "1" when there is a motion and "0" when there is no motion. As for the luminance data, the luminance at which 40 dB of S/N ratio is provided is set as the reference luminance $E_O$ and the data at this luminance is represented by "111111". And the luminance data becomes "011111" at the luminance $E_0/2$ and become "001111" at the luminance $E_0/4$. The luminance data is "111111" at the luminance higher than $E_0$.

The accumulation period controlling circuit 52 is made up of a logic circuit as shown in FIG. 11. Accumulation data is output from the accumulation period controlling circuit 52 and the data is input to the first pulse generator 4. In the pulse generator 4, there is an accumulation period regulating circuit and this accumulating period regulating circuit is formed, for example, of a circuit as shown in FIG. 10. In this case, the accumulation data for providing one time the reference accumulation period is "1111110", that for providing two times the reference accumulation period is "1111101", and that for providing 64 times the reference accumulation period is "0000001".

The truth table for the embodiment of FIG. 11 is shown in FIG. 12. The X mark in FIG. 12 shows that either "" or "0" may be in the place indicated by this mark.

The operation of the circuit of FIG. 11 is as under. In the case where a motion of the object is detected and thereby either one or both of the two motion data input terminals were turned to "1", the LSB of the accumulation data becomes "0" by means of the NOR gate 521 and other bits become "1" by means of the inverter 522 and OR gates 523–527. Namely, the accumulation data becomes "1111110" and the accumulation period is set to the reference state (m=1).

Even if there is no motion but if the luminance is $E_0/2$ or above, likewise m =1 is provided. When there is no motion of the object and the luminance is below $E_0/2$, the MSB of the luminance data becomes "0", so that the LSB of the accumulation data becomes "1" and the next bit becomes "0", and therefore, m becomes 2 or above. Then, if the luminance is $E_0/4$ or above, the next bit to the MSB of the luminance data is "1", so that the accumulation data becomes "1111101" and m=2 is provided.

In like manner, m=4 is provided when the luminance is below $E_0/4$ but is $E_0/8$ or above, m=8 is provided when the luminance is below $E_0/8$ but is $E_0/16$ or above, m=16 is provided when the luminance is below $E_0/16$ but is $E_0/32$ or above, m=32 is provided when the luminance is below $E_0/32$ but is $E_0/64$ or above, and m =64 is provided when the luminance is below $E_0/64$.

Thus, according to the present embodiment, a reproduced picture with a high S/N ratio is obtained even if the luminance is low, and since the accumulation period immediately returns to the reference period when there is a motion of the object, the picture obtained is free from the residual image.

Figure 13:
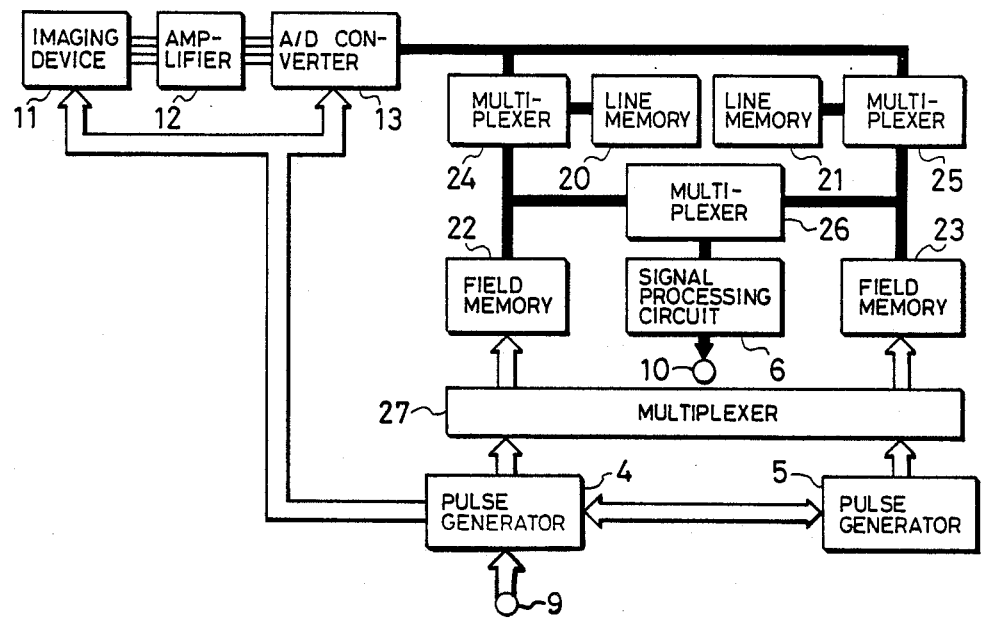
FIG. 13 shows another application example of the present invention.

Another application example of the present invention is shown in FIG. 13. The application example shown in FIG. 13 is such that the imaging device 11 for analog output as shown in FIG. 7 is applied to the embodiment shown in FIG. 4. The operation of the application example of FIG. 13 is like that of the embodiment shown in FIG. 4. The object of the present invention is achieved also by this application example.

Figure 14:
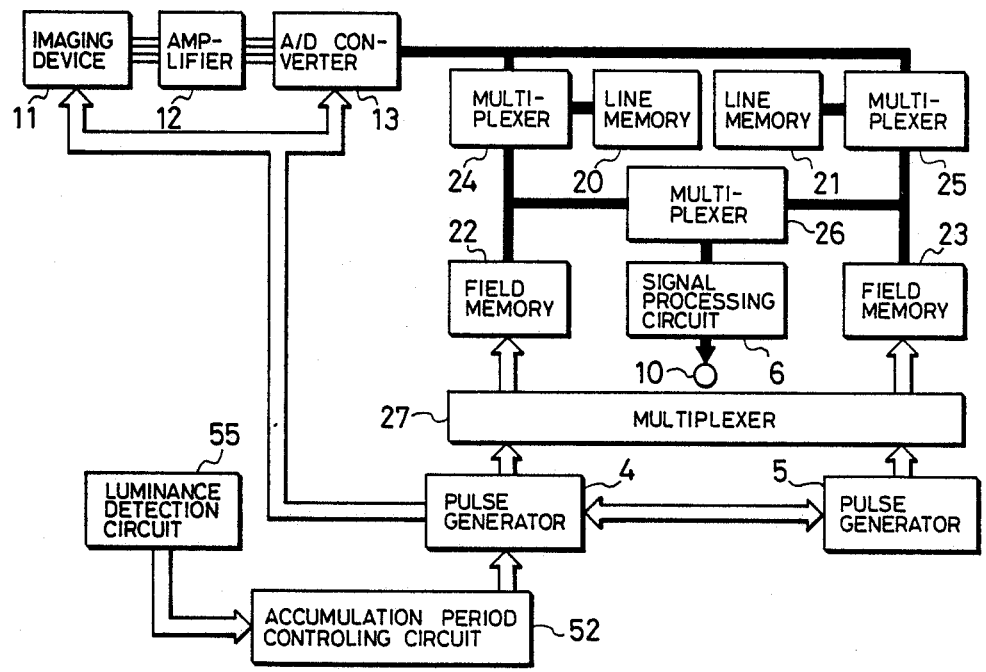
FIG. 14 shows a further application example of the present invention.

A further application example of the present invention is shown in FIG. 14. The application example shown in FIG. 14 is such that the luminance detection circuit 55 and the accumulation period controlling circuit 52 are attached to the application example of FIG. 13. Namely, it is adapted therein such that the accumulation period on the imaging device 11 is automatically controlled by having luminance of an object detected by means of the luminance detection circuit 55. The operation of the application example shown in FIG. 14 is virtually the same as that of the embodiment shown in FIG. 4. The object of the present invention is also achieved by the present application example.

Figure 15:
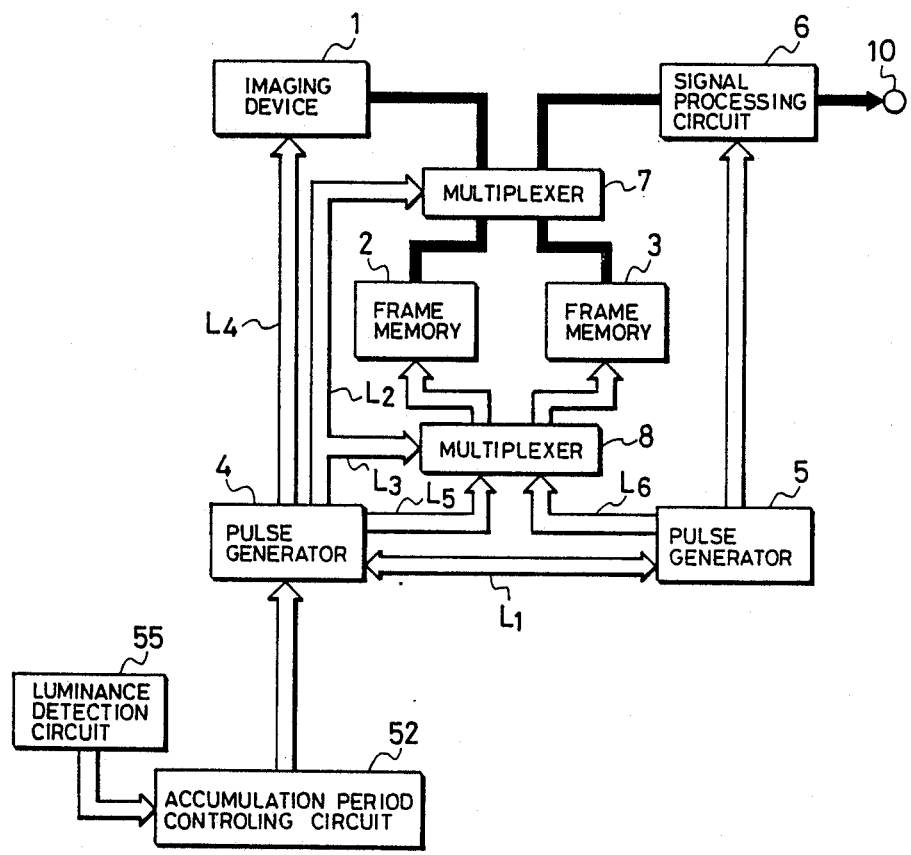
FIG. 15 shows a still further application example of the present invention.

A still further application example is shown in FIG. 15. The application example shown in FIG. 15 is such that the luminance detection circuit 55 and the accumulation period controlling circuit 52 are attached to the embodiment shown in FIG. 1. Namely, it is adapted therein such that the accumulation period on the imaging device 11 is automatically controlled by having luminance of an object detected by means of the luminance detection circuit 55. The operation of the application example shown in FIG. 15 is virtually the same as that of the embodiment shown in FIG. 1. The object of the present invention is also achieved by the present application example.

According to the present invention as described so far, the accumulation period of the imaging device is prolonged by m times when the object is dark, and thereby, the sensitivity is improved by $\sqrt{m}$ times against the shot noise and by $m^{3/2}$ times against the blue noise.

Further, since the accumulation period is automatically controlled according to luminance of the object or a motion of the object, a reproduced picture with a reduced residual image can be obtained.

What is claimed is:

1. In a solid state imaging apparatus having photoelectric conversion means consisting of an array of plural photoelectric conversion devices disposed in two dimensions for converting optical information into analog electrical picture element data and means for digitizing the picture element data obtained by said array of photoelectric conversion devices and sequentially reading out the digitized picture element data; and an output circuit to which the picture element data is input and from which a picture signal is output; said solid state imaging apparatus comprising:

a first field memory having a capacity for storing digitized picture element data for one field;

a second field memory having a capacity for storing digitized picture element data for one field;

a first line memory having a capacity for storing digitized picture element data for one line;

a second line memory having a capacity for storing digitized picture element data for one line;

first switching means, during a period m times the horizontal scanning period, supplying digitized picture element data obtained from said photoelectric conversion means to said first line memory and, during another period of one horizontal scanning period, supplying the picture element data stored in said first line memory to said first field memory;

second switching means, during a period m times the horizontal scanning period, supplying digitized picture element data obtained from said photoelectric conversion means to said second line memory and, during another period of one horizontal scanning period, supplying the picture element data stored in said second line memory to said second field memory;

third switching means for connecting said first and second field memories alternately to said output circuit;

first signal generator means for generating a control signal for setting the accumulation period on said array of photoelectric conversion devices to m (m>1) times the field period and supplying this signal to said photoelectric conversion means and also generating write addresses for said first and second field memories;

second signal generator means for generating read addresses for reading out digitized picture element data from said first and second field memories at intervals of one horizontal scanning period; and fourth switching means for supplying the read addresses generated by said second signal generator means to said first and second field memories alternately at intervals of one horizontal scanning period and also supplying the write address generated by said first signal generator means to said first or second field memory during a certain horizontal scanning period, wherein said photoelectric conversion means outputs digitized picture element data for one line during a period m times the horizontal scanning period according to the control signal supplied from said first signal generator means, and during a certain period m times the horizontal scanning period, the digitized picture element data output from said photoelectric conversion means is written in said first line memory during the period m times the horizontal scanning period, picture element data stored in said second line memory is read out and written in said second field memory, and picture element data stored in said first and second field memories are supplied to said output circuit alternately at intervals of one horizontal scanning period, whereas, during another period m times the horizontal scanning period, the digitized picture element data output from said photoelectric conversion means is written in said second line memory during the period m times the horizontal scanning period, picture element data stored in said first line memory is read out and written in said first field memory, and picture element data stored in said first and second field memories are supplied to said output circuit alternately at intervals of one horizontal scanning period.

2. A solid state imaging apparatus having photoelectric conversion means comprised of an array of plural photoelectric conversion devices disposed in two dimensions for converting optical information into analog electrical picture element data and means for digitizing the picture element data obtained by said array of photoelectric conversion devices and sequentially reading out the digitized picture element data; and an output circuit to which the picture element data is input and from which a picture signal is output; said solid state imaging apparatus comprising:

two memories each thereof having a capacity at least for storing the picture element data for one field;

first switching means for connecting said two memories alternately to said output circuit;

first signal generator means for generating a control signal for setting the accumulation period on said array of photoelectric conversion devices to m ($m>1$) times the field period and a write address for said memory;

second signal generator means for generating a read address for reading out digitized picture element data from said memory at intervals of one field period; and second switching means for supplying the write address generated by said first signal generator means and the read address generated by said second signal generator means to said two memories such that the write address is supplied to one memory and the read address is supplied to the other memory, alternately; wherein digitized picture element data obtained from said photoelectric conversion means is written in one memory of said two memories during a period m times the field period, and during that period, digitized picture element data is read out from the other memory m times at intervals of one field period and the thus read out picture element data is supplied to said output circuit, further comprising a luminance detection circuit and an accumulation period controlling circuit in response to an output signal of said luminance detection circuit for outputting accumulation data and supplying the data to said first signal generator means, whereby the accumulation period on said array of photoelectric conversion devices is controlled according to luminance of an object.

3. A solid state imaging apparatus having photoelectric conversion means comprised of an array of plural photoelectric conversion devices disposed in two dimensions for converting optical information into analog electrical picture element data and means for digitizing the picture element data obtained by said array of photoelectric conversion devices and sequentially reading out the digitized picture element data; and an output circuit to which the picture element data is input and from which a picture signal is output; said solid state imaging apparatus comprising:

two frame memories each thereof having a capacity for storing the picture element data for one frame;

first switching means for connecting said one frame memory of said two frame memories to said photoelectric conversion means and the other frame memory to said output circuit, alternately;

first signal generator means for generating a control signal for setting the accumulation period on said array of photoelectric conversion devices to m ($m>1$) times the field period and supplying this signal to said photoelectric conversion means and also generating a write address for said frame memory;

second signal generator means for generating a read address for reading out digitized picture element data from said frame memory at intervals of one field period; and second switching means for supplying the write address generated by said first signal generator means and the read address generated by said second signal generator means to said two frame memories such that the write address is supplied to one memory and the read address is supplied to the other frame memory, alternately for each frame; wherein said photoelectric conversion means outputs digitized picture element data during a period m times the field period according to the control signal supplied from said first signal generator means, the digitized picture element data output from said photoelectric conversion means is written in one memory of said two frame memories during a period m times the field period, and during that period, picture element data is read out from the other memory m times at intervals of one field period and the thus read out picture element data is supplied to said output circuit, further comprising a luminance detection circuit and an accumulation period controlling circuit in response to an output signal of said luminance detection circuit for outputting accumulation data and supplying the data to said first signal generator means, whereby the accumulation period on said array of photoelectric conversion devices is controlled according to luminance of an object.

4. A solid state imaging apparatus according to claim 1 further comprising a luminance detection circuit and an accumulation period controlling circuit in response to an output signal of said luminance detection circuit for outputting accumulation data and supplying the data to said first signal generator means, whereby the accumulation period on said array of photoelectric conversion devices is controlled according to luminance of an object.

5. A solid state imaging apparatus according to claim 2 further comprising a luminance detection circuit, a motion detection circuit for detecting motion of an object, and an accumulation period controlling circuit in response to an output signal of said luminance detection circuit and an output signal of said motion detection circuit for supplying accumulation data to said first signal generator means, whereby the accumulation period on said array of photoelectric conversion devices is controlled according to luminance and motion of the object.

6. A solid state imaging apparatus according to claim 3 further comprising a luminance detection circuit, a motion detection circuit for detecting motion of an object, and an accumulation period controlling circuit in response to an output signal of said luminance detection circuit and an output signal of said motion detection circuit for supplying accumulation data to said first signal generator means, whereby the accumulation period on said array of photoelectric conversion devices is controlled according to luminance and motion of the object.

7. A solid state imaging apparatus according to claim 1 further comprising a luminance detection circuit, a motion detection circuit for detecting motion of an object, and an accumulation period controlling circuit in response to an output signal of said luminance detection circuit and an output signal of said motion detection circuit for supplying accumulation data to said first signal generator means, whereby the accumulation period on said array of photoelectric conversion devices is controlled according to luminance and motion of the object.

* * * * *